Patented Oct. 14, 1947

2,428,907

UNITED STATES PATENT OFFICE 2,428,907

COPOLYMERS OF A DIENE AND AN ALPHA-SUBSTITUTED BETA-HALO ACRYLONITRILE

Albert M. Clifford, Stow, and Joy G. Lichty, Cuyahoga Falls, Ohio, assignors to Wingfoot Corporation, Akron, Ohio, a corporation of Delaware No Drawing. Application December 26, 1944, Serial No. 569,917

5 Claims. (Cl. 260—92.7)

This invention relates to new and useful copolymers of alpha-substituted beta-haloacrylonitriles. More particularly, it relates to rubber-like copolymers of conjugated hydrocarbon or halogen-substituted hydrocarbon diolefins and unsaturated nitriles having a hydrocarbon group substituted on the alpha carbon atom and a halogen substituted on the beta carbon atom.

The unsaturated nitriles which may be used in accordance with the practice of this invention have the following structural formula:

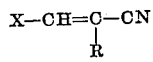

wherein X is a halogen atom and R a hydrocarbon radical, such as alkyl, aryl, aralkyl and cycloalkyl. The unsaturated nitriles useful in the practice of this invention include alpha-alkyl-beta-chloroacrylonitrile, alpha-alkyl-beta-bromoacrylonitrile, alpha-alkyl-beta-fluoroacrylonitrile, and including the compounds such as beta-chloromethacrylonitrile, alpha-ethyl-beta-chloroacrylonitrile, alpha-phenyl-beta-chloroacrylonitrile, alpha-cyclohexyl-beta-chloroacrylonitrile, alpha-benzyl-beta-chloroacrylonitrile, alpha-propyl-beta-chloroacrylonitrile and the corresponding bromo-, fluoro- and iodo-derivatives. The alpha substituent of the beta-haloacrylonitriles may also be a higher molecular alkyl, aryl, aralkyl or cycloalkyl radical, although generally the simpler structures enumerated above are preferred.

The unsaturated acrylonitriles used in preparing the new copolymers may be synthesized by chlorinating saturated nitriles and subsequently dehydrohalogenating the compounds so prepared. The new compounds may also be prepared from halomethyl ketones by reaction with hydrocyanic acid, followed by acetylation and dehydroacetylation. Further details of the preparation are described in application Serial No. 367,772, filed November 29, 1940.

In accordance with this invention the unsaturated beta halonitriles are copolymerized with conjugated diolefins or halogen-substituted diolefins, such as butadiene-1,3, isoprene, 2,3-dimethyl butadiene-1,3, chloroprene, the chloro substituted isoprenes, 2,3-dichlorobutadiene-1,3, 2,3-dibromobutadiene-1,3, and other hydrocarbon and halogen substituted derivatives of butadiene-1,3.

The new synthetic rubbers are preferably prepared in aqueous emulsion. Mixtures of the diolefin and the unsaturated beta chloronitrile in desired proportions are placed in a reaction vessel with an emulsifying agent, an oxidizing agent and a buffer solution adapted to maintain a desired hydrogen ion concentration, and a small amount of a catalyst such as carbon tetrachloride. The emulsifying agent may be a diluted solution of a wetting agent, such as sodium salt of a sulfate mono ester of a higher fatty alcohol, an aromatic mono sodium sulfonate, sodium lauryl sulfate, or a sulfonated hydrocarbon. The oxidizing agent may be sodium perborate, an alkali metal persulfate, hydrogen peroxide, or any metallic or organic peroxide. The buffer salt solution used is generally of McIlvaine type, being comprised of trisodium phosphate and citric acid in proportions adapted to yield the desired hydrogen ion concentration.

The reaction is conducted by heating the closed reaction vessel to a temperature preferably between 30 and 50° C. with constant agitation by rocking or tumbling the reaction vessel for a period of time sufficient to induce polymerization under the conditions of reaction being used.

Generally, copolymers having a prevalent proportion of butadiene are preferred, for example, 50 to 75 percent of butadiene-1,3 and 50 to 25 percent of beta haloacrylonitrile. Compositions having 40 to 80 percent of the diolefin and 60 to 20 percent of the nitrile are operative and are included within the scope of this invention.

The new copolymers have desirable tensile strength, elongation, and elasticity, which render them valuable as substitutes for natural rubber in any of its many uses.

Example 1

Alpha-methyl-beta-chloroacrylonitrile was prepared by dehydrochlorinating alpha, beta-dichloroisobutyronitrile by the following reaction:

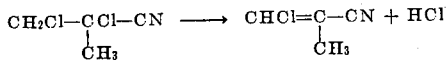

The hydrogen chloride was removed by heating in the presence of caustic soda. The unsaturated nitrile was separated by fractional distillation and identified as beta-chloro-alpha methyl-acrylonitrile.

The alpha methyl beta chloroacrylonitrile was copolymerized with butadiene in an emulsion. The following materials were placed in a glass lined reaction vessel.

| | | |
|---|---|---|
| 5% sodium lauryl sulfate | cc | 10 |
| McIlvaine's buffer solution adapted to yield a pH of 8.85 | cc | 10 |
| $NaBO_4.4H_2O$ | g | 0.133 |
| Carbon tetrachloride | g | 0.48 |
| Butadiene-1,3 | g | 9.6 |
| Alpha methyl beta chloroacrylonitrile | g | 6.4 |

The reaction vessel was heated at 50° C. while being continuously agitated. At the end of six days a yield of 57 percent of copolymer was obtained, and at the end of ten days a yield of 82 percent of copolymer.

*Example 2*

Several polymerizations were conducted using the procedure described in Example 1, except that the McIlvaine buffer was varied to yield slightly acid, neutral, and slightly basic solutions to determine the optimum hydrogen ion concentration. As a control, the McIlvaine buffer was left out of one polymerization experiment. The following tabulation shows the variation in yield with hydrogen ion concentration after ten days reaction:

| | |
|---|---|
| 4.7 | 91.2 |
| 7.0 | 89 |
| 8.85 | 82 |
| No buffer | 81.1 |

This application is a continuation in part of application Serial No. 367,772, filed November 29, 1940.

Although the invention has been described with respect to specific compositions, it is not intended that the details thereof shall be limitations upon the scope of the invention, except as included within the following claims.

We claim:

1. A copolymer of 40 to 80 percent of a conjugated hydrocarbon diolefin and 60 to 20 percent of an alpha-alkyl-beta-halo-acrylonitrile.

2. A copolymer of 20 to 60 percent of beta-chloro-methacrylonitrile and 80 to 40 percent of butadiene-1,3.

3. A copolymer of 20 to 60 percent of beta-chloromethacrylonitrile and 80 to 40 percent of isoprene.

4. A copolymer of 20 to 60 percent of beta-chloromethacrylonitrile and 80 to 40 percent of chloroprene.

5. A copolymer of 40 to 80 percent of a compound of the group consisting of conjugated hydrocarbon diolefines and the conjugated hydrocarbon diolefines having up to two halogen substituents, and 20 to 60 percent of a nitrile having the structural formula

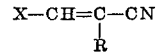

wherein X is a halogen atom and R is a radical of the group consisting of alkyl, aryl, aralkyl, and cycloalkyl radicals.

ALBERT M. CLIFFORD.
JOY G. LICHTY.

REFERENCES CITED

The following references are of record in the file of this patent:

UNITED STATES PATENTS

| Number | Name | Date |
|---|---|---|
| 2,326,095 | D'Ianni | Aug. 3, 1943 |